United States Patent [19]
Huang

[11] Patent Number: 5,397,123
[45] Date of Patent: Mar. 14, 1995

[54] RACQUET AND GRIP

[76] Inventor: Ben Huang, 19472 Woodlands La., Huntington Beach, Calif. 92648

[21] Appl. No.: 278,186

[22] Filed: Jul. 21, 1994

Related U.S. Application Data

[63] Continuation-in-part of Ser. No. 196,010, Feb. 10, 1994, Ser. No. 637,931, Jan. 14, 1991, abandoned, Ser. No. 890,383, May 19, 1992, abandoned, Ser. No. 953,190, Sep. 29, 1992, and Ser. No. 58,313, May 3, 1993.

[51] Int. Cl.⁶ .............................................. A63B 49/08
[52] U.S. Cl. .................................. 273/73 J; 273/81 B
[58] Field of Search ................. 273/73 J, 75, 81 R, 273/165, 81.4, 81.5, 81.6, 81 B, 81 D

[56] References Cited

U.S. PATENT DOCUMENTS

| | | | |
|---|---|---|---|
| 2,086,062 | 7/1937 | Bray | 273/73 J |
| 3,489,031 | 1/1970 | Meier | 273/73 J X |
| 3,645,008 | 2/1972 | Delsack | 273/73 J |
| 4,907,810 | 3/1990 | Whiteford | 273/73 J |
| 5,018,733 | 5/1991 | Brand | 273/73 J X |

FOREIGN PATENT DOCUMENTS 2665097 1/1992 France ..................... 273/73 J Primary Examiner—William E. Stoll
Attorney, Agent, or Firm—Fulwider Patton Lee & Utecht

[57] ABSTRACT

A tennis racquet and grip for the handle of such tennis racquet. The grip has a polyurethane layer bonded to a felt layer. The polyurethane layer is formed with a plurality of dimples, each of which merge into a perforation that extends through the felt layer. The racquet handle is formed with air passages in communication with the dimples and perforations to reduce formation of perspiration on the grip and to enhance the cushioning qualities of the grip.

8 Claims, 5 Drawing Sheets

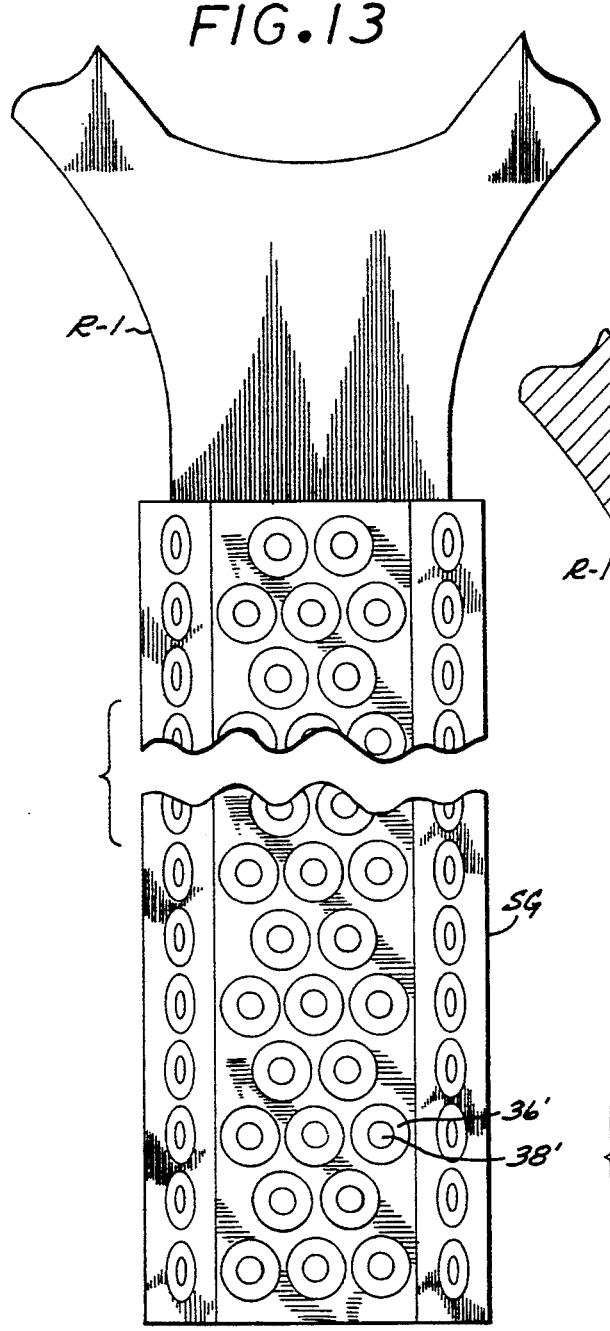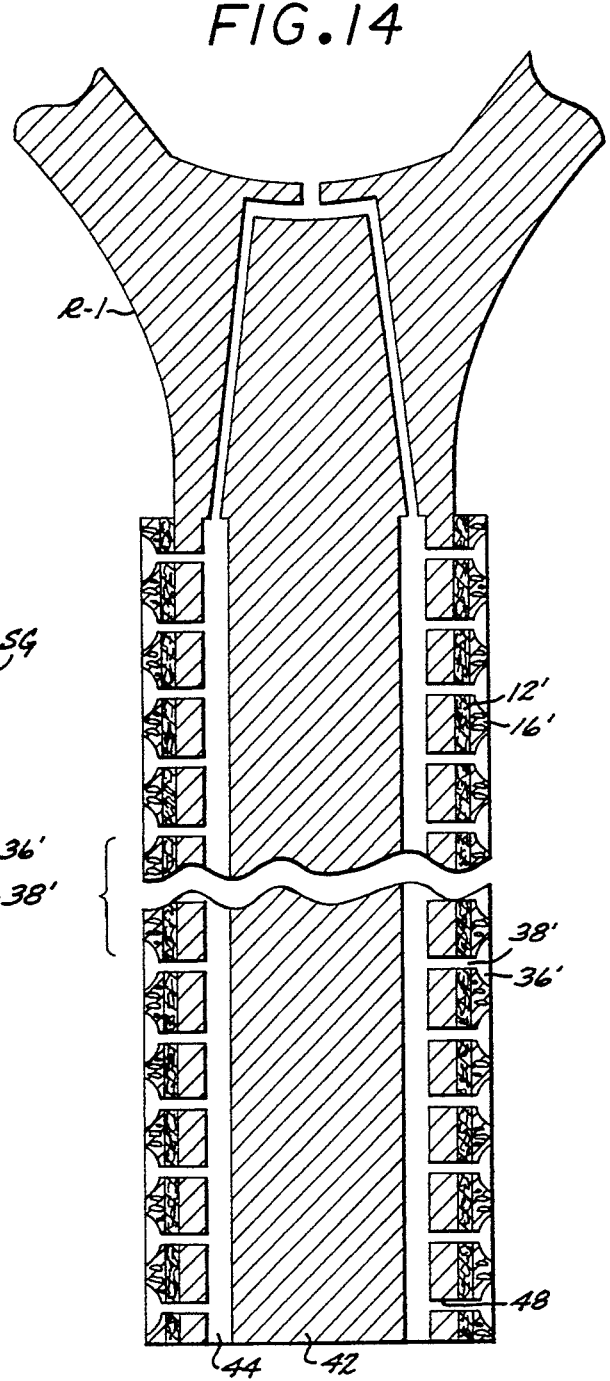

RACQUET AND GRIP

This is a continuation-in-part of application Ser. No. 08/196,010, filed on Feb. 10, 1994, pending and a continuation-in-part of Ser. No. 07/637,931, filed on Jan. 14, 1991, now abandoned, and a continuation-in-part of Ser. No. 07/890,383, filed on May 26, 1992, now abandoned, and a continuation-in-part of Ser. No. 07/953,190, filed on Sep. 29, 1992, pending, and a continuation-in-part of Ser. No. 08/058,313, filed on May 3, 1993, pending.

BACKGROUND OF THE INVENTION

The present invention relates to an improved racquet and grip, and other devices employing handles that are subject to shock when such devices are impacted, as for example, tennis racquets, racquetball racquets, golf clubs, baseball bats and hammers.

It is well-known that shock generated by impact between a device such as a tennis racquet and a tennis ball can affect muscle tissue and arm joints such as elbow joints. Such shock often results in "tennis elbow" which is a painful affliction commonly experienced by active tennis players. Medical theories attribute "tennis elbow" to continuous exposure of the playing arm of a tennis player to shock and vibration generated by striking a tennis ball with a tennis racquet. The energy generated is usually of high frequency and short duration with rapid decay, and which is often known as "impact shock." Tight grasping of a grip to keep it from slipping contributes to "tennis elbow." While various types of grips have been proposed for inhibiting "tennis elbow," the grip of the present invention successfully reduces or even eliminates "tennis elbow" type shock to the muscle tissue and arm joints of the users of tennis racquets, racquetball racquets, golf clubs, baseball bats, and other impact imparting devices.

It is also well-known that perspiration tends to be deposited upon a racquet grip by a player's hand thereby inhibiting the player's control of the racquet. In an effort to reduce the perspiration problem, some racquet grips have utilized straight perforations extending through the grip. These grips, however, have not solved the problem.

SUMMARY OF THE INVENTION

The applicant has developed an improved racquet and grip, particularly designed to provide excellent shock absorbing qualities when mounted upon the handle of "wide-body" tennis racquets which have recently achieved wide popularity. Applicant's preferred form of improved grip utilizes a polyurethane outer layer not only to provide tackiness, but more importantly, to cushion the arm and hand of the racquet user against the shock created when the tennis ball hits the tennis racquet. A layer of felt is bonded to the inner surface of applicant's polyurethane layer in order to provide strength to such polyurethane layer, and also as a means for attaching the bonded-together polyurethane layer and textile layer to the racquet handle. The improved grip of the present invention additionally aligns the pores of the polyurethane layer generally normal to the longitudinal axis of the racquet handle so as to further improve the cushioning characteristics of the polyurethane layer.

It is an important feature of the present invention that the polyurethane layer of the grip is provided with a plurality of inwardly extending dimples, the lower portion of each of which merges into a perforation which extends through the felt layer. Moreover, the racquet handle is formed with air passages that connect the dimples and perforations of the grip with the atmosphere. When the grip is grasped by a player with the palm and fingers of the player's hand covering some of the dimples, air is first pumped inwardly through the dimple and perforations into the racquet air passages, and then to the atmosphere. When the player relaxes his grip, and uncovers the dimples, air will be sucked back through the perforations and dimples, and racquet air passages. Where the grip utilizes a felt layer such felt layer assists movement of the air inwardly and outwardly relative to the grip because of its porosity. The interchange of air as it is pumped through the grip and racquet air passages serves to continually evaporate perspiration which would normally accumulate on the exterior surface of the grip. Accordingly, the player maintains a better grasp of the grip than is true with previously known grips. In this manner, the player can more accurately control the flight of the ball. Also, the shock absorbing qualities of the grip are improved to thereby reduce the tendency of the player to acquire "tennis elbow."

BRIEF DESCRIPTION OF THE DRAWINGS

FIG. 13 is a broken side view of a sleeve type grip of the present invention mounted on the tennis racquet shown in FIG. 9; and FIG. 14 is broken cross-sectional view of the racquet and grip of FIG. 13.

DETAILED DESCRIPTION OF THE DRAWINGS

Figure 5:
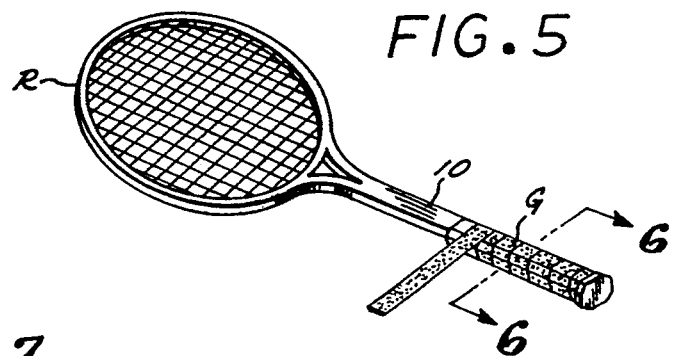
FIG. 5 is a perspective view in reduced scale showing the grip of FIGS. 1 through 4 being applied to the handle of a conventional tennis racquet.
Figure 6:
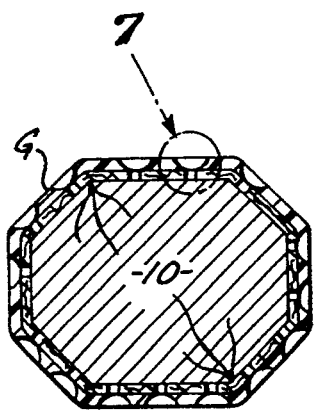
FIG. 6 is a vertical sectional view taken in enlarged scale along line 6—6 of FIG. 5.

Referring to the drawings, a preferred form of grip G of the present invention is shown in FIG. 5 attached to the handle 10 of a conventional tennis racquet R. The grip G incudes an open-pored textile layer, generally designated 12, having an inner surface 14 which is adhered to the racquet handle 10. The grip also includes a smooth closed pore polyurethane layer generally designated 16 which is bonded to the textile layer 12. The bonded-together polyurethane and textile layers are seen to be configured as a unitary strip which is wrapped about the racquet handle 10 in the manner depicted in FIG. 5.

Figure 4:
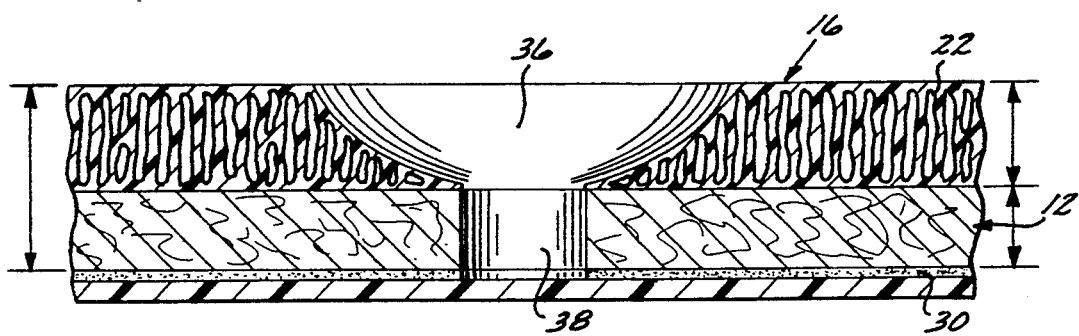
FIG. 4 is a further enlarged view of the encircled area designated 4 in FIG. 3.
Figure 7:
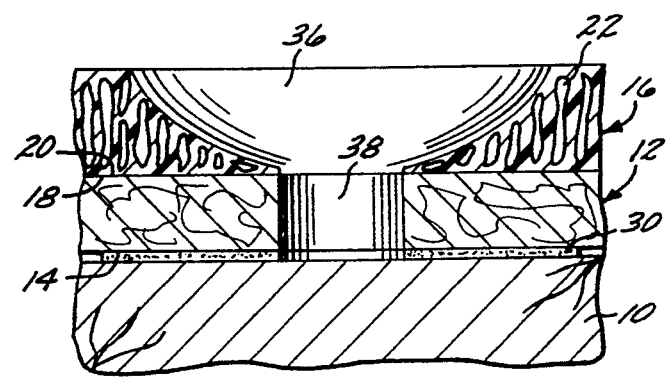
FIG. 7 is a further enlarged view of the encircled area designated 7 in FIG. 6.
Figure 8:
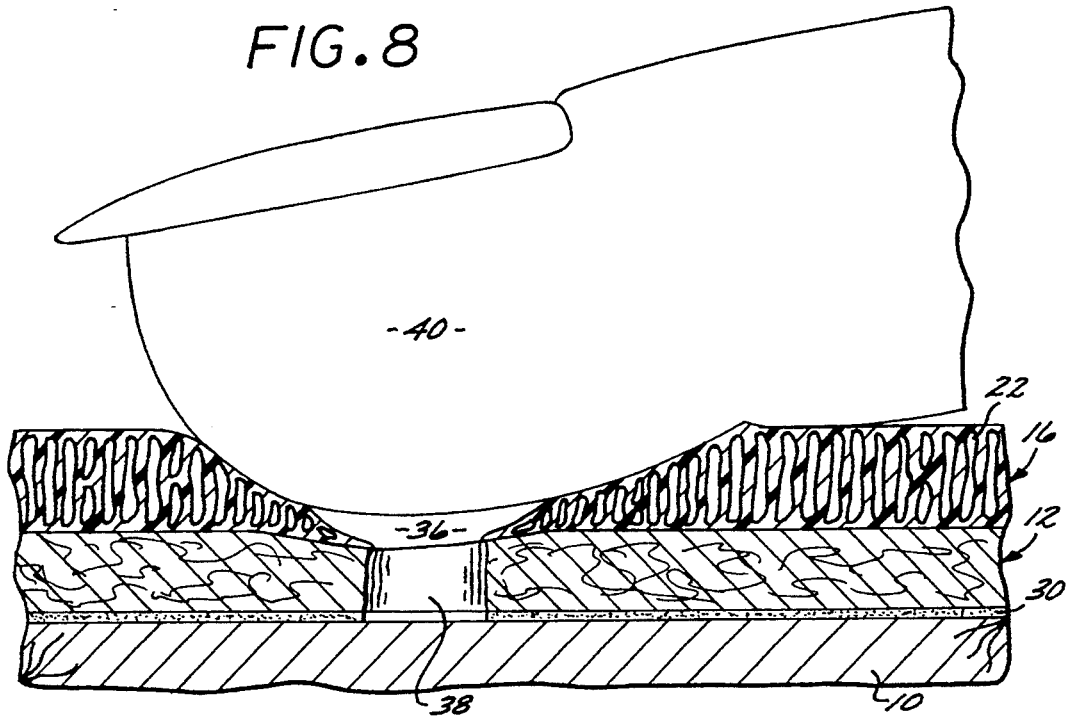
FIG. 8 is a sectional view showing how the improved grip of the present invention deforms when grasped by a user.

More particularly, the textile layer 12 is formed of a suitable open-pored material, such as felt, and has its upper surface 18 bonded to the lower surface 20 of the polyurethane layer 16. As indicated in FIGS. 4, 7 and 8, the polyurethane layer 16 is formed with pores 22 which extend vertically, i.e., generally normal to the longitudinal axis of racquet handle 10 when the grip is affixed to such handle. The polyurethane layer 16 may be formed in a conventional manner by coating one side of a felt strip with a solution of polyurethane (e.g., polyester or polyether) dissolved in dimethyl formamide (DMF), immersing the coated strip in water baths to displace the DMF and to cause the urethanes to coagulate, and finally driving off the water by the application of pressure and heat. In this manner, pores 22 extending perpendicularly relative to the strip's longitudinal axis are formed while the underside of the polyurethane strip is bonded to the outer surface 18 of the felt strip.

Figure 1:
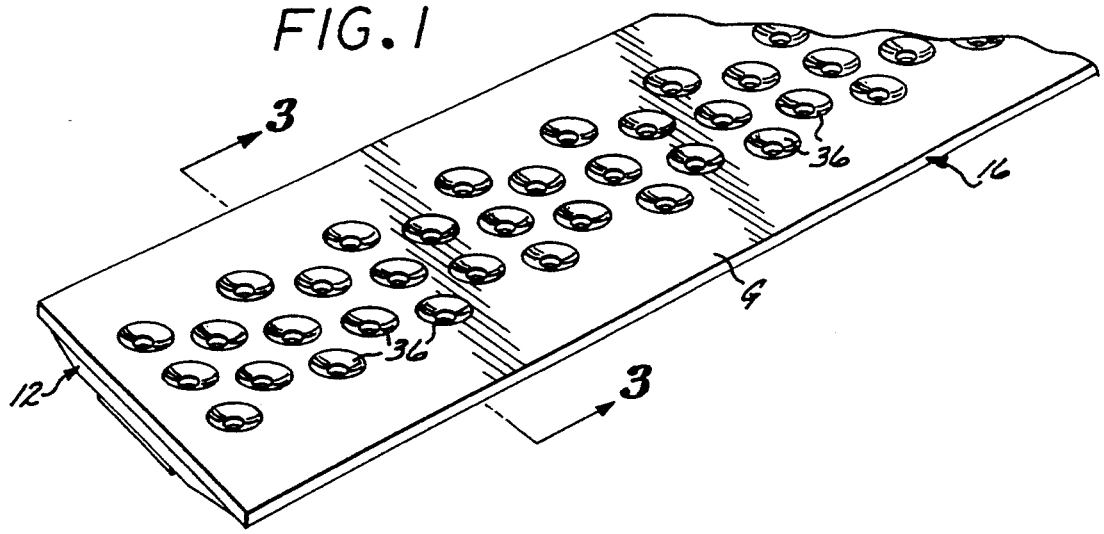
FIG. 1 is a broken perspective view of an improved shock absorbing grip embodying the present invention.
Figure 2:
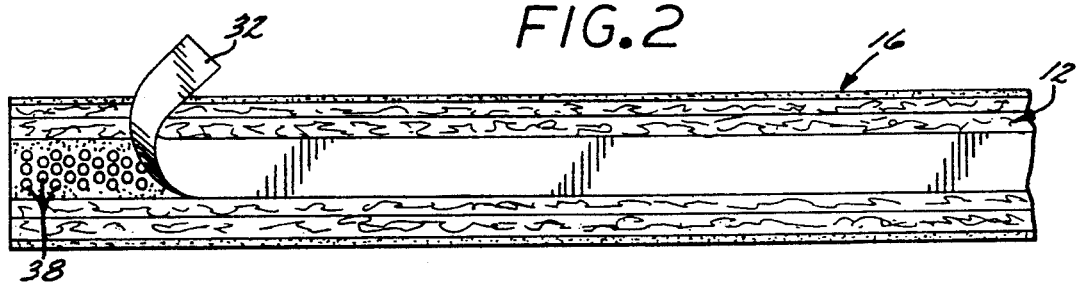
FIG. 2 is a broken view of the underside of said grip.
Figure 3:
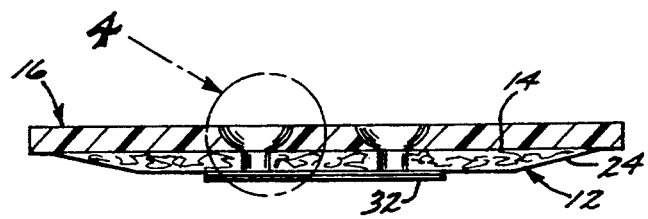
FIG. 3 is a vertical sectional view taken in enlarged scale along line 3—3 of FIG. 1.

As indicated in FIG. 3, the portions of the felt layer 12 outwardly of its central region are slanted upwardly and outwardly at 24 to facilitate wrapping of the completed polyurethane and felt strip around the racquet handle 10. The underside 14 of the felt is provided with a conventional adhesive layer 30 which is originally covered with a protective quick-release tape 32. To apply the grip G to the racquet handle 10, the protective tape 32 is stripped off the adhesive 30 as indicated in FIG. 2. Thereafter, the strip of bonded-together polyurethane and felt is tightly wrapped around the racquet handle 10, as is conventional in mounting tennis handle grips of this type.

The layer of polyurethane 16 of grip G provides a cushioning effect for the grip when the tennis racquet R impacts a tennis ball (not shown). The polyurethane layer 16 also provides tackiness so as to inhibit the racquet user's hand from slippage as the tennis ball is struck. The felt layer 12 provides strength to the polyurethane layer 16 and also serves as a means for attaching the bonded-together polyurethane and felt strip to the racquet handle. The polyurethane layer is provided with a plurality of inwardly extending dimples 36, the lower portion of each of which merges into a perforation 38 which extends through the felt layer 12 and adhesive 30. It has been found that when the grip G is grasped by a player with the palm and fingers of the player's hand covering the dimples 36, air is first pumped inwardly through the dimple 36 and perforations 38, and then into the felt. When the player relaxes his grip, and uncovers the dimples 36, air will be sucked back through the dimples and perforations to achieve "breathing" of air by the grip. The felt layer permits movement of the air inwardly and outwardly relative to the grip because of its porosity. The interchange of air as it is pumped through the grip serves to evaporate perspiration which would normally accumulate on the exterior surface of the polyurethane layer. Accordingly, the player maintains a better hold on the grip than is true with previously known grips, and is less likely to acquire "tennis elbow." It has been determined that good results are obtained where a diameter of about $\frac{1}{8}''$ is utilized for the dimples at the intersection with the outer surface of the polyurethane layer, and a diameter of about 1/32" is used for the perforations.

As noted hereinbefore, applicant has discovered that greatly improved shock absorbing qualities may be obtained in a tennis racquet grip where the thickness of the polyurethane layer relative to the thickness of the felt layer is increased over the ratio employed in prior art grips. More specifically, applicant considers that the ratio of the thickness of the polyurethane layer to the textile layer should be a minimum of approximately 0.18, i.e., equal to or larger than approximately 0.18. In the embodiment shown in the drawings, and as indicated in FIG. 4, in a grip having a total thickness of 2.0 mm, the polyurethane layer has a thickness of 1.1 mm, while the felt layer has thickness of 0.9 mm, i.e., the thickness of the polyurethane body is about equal to or slightly thicker than the thickness of the textile body. Excellent results have been obtained with this ratio.

Referring now to FIG. 8, such figure shows how the improved grip G of the present invention deforms when grasped by the fingers 40 of a user. Thus, the user's fingers compress the polyurethane layer 22 to a considerable extent while only slightly compressing the felt layer 12. Compression of the polyurethane is enhanced by the vertical alignment of the pores 22. Such compression not only greatly inhibits the shock applied by the racquet to the user's arm and hand created when the tennis ball hits the tennis racquet, but also permits the aforementioned "breathing" of air by the grip. Additionally, the extent of compression afforded by the polyurethane enhances the gripping power of the user's hand, particularly when coupled with the tackiness of the polyurethane.

Referring now to FIGS. 9–12, the aforedescribed grip G is shown mounted on a racquet R-1 embodying the present invention. Racquet R-1 differs from a conventional racquet in that the handle thereof 42 is formed with a plurality of air passages that are in communication with the atmosphere, such air passages being connected with the dimples and perforations of grip G. More particularly, racquet handle 42 is formed with a plurality of vertically extending main air passages 44, the upper ends of which merge with a plurality of auxiliary air passages 46 formed in the racquet throat. The racquet handle 42 is also formed with a plurality of horizontal air passages 48 which intersect the vertical air passages. The radially outer ends of horizontal air passages 48 are aligned with the grip perforations 38, and hence the dimples 36 of the grip. As indicated particularly in FIG. 10, with this arrangement, when the grip G is grasped by the fingers 40 of a user, the user's fingers compress the polyethylene layer 16 to a considerable extent, while only slightly compressing the felt layer 12. It is important to note that compression of the grip G is facilitated by the alignment of the dimples and perforations with the air passages of the racquet R-1, such compression of the grip G serving to pump air through the racquet, since such passages are in communication with the atmosphere. This pumping action increases the amount of air circulating through the grip to keep a player's hand dry and comfortable, and also enhances the shock absorbing function of the grip.

Figure 9:
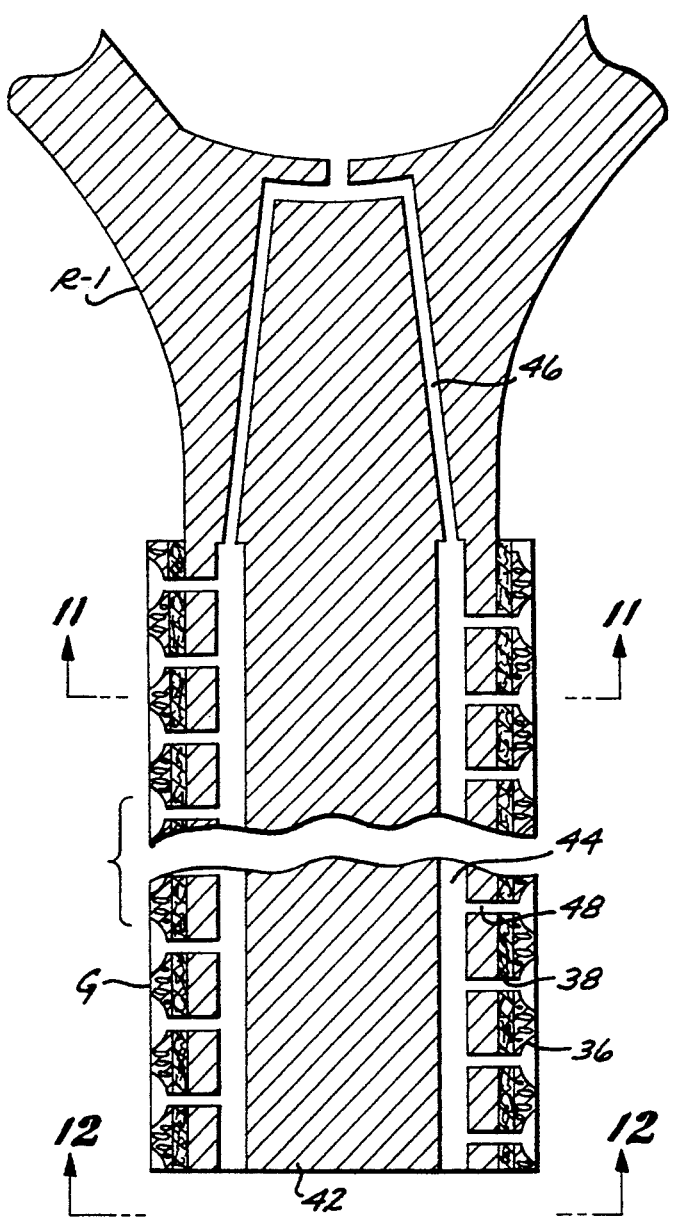
FIG. 9 is a broken cross-sectional side view of the grip of FIGS. 1–8 mounted on a tennis racquet constructed in accordance with the present invention.
Figure 12:
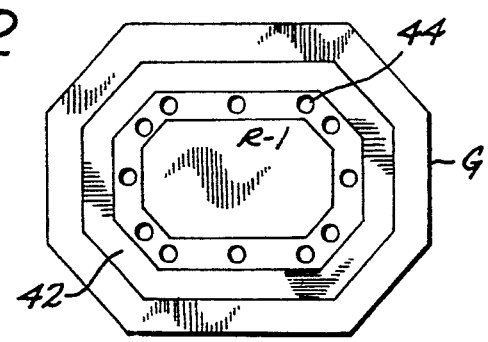
FIG. 12 is a bottom view of the racquet handle from line 12—12 of FIG. 9.
Figure 10:
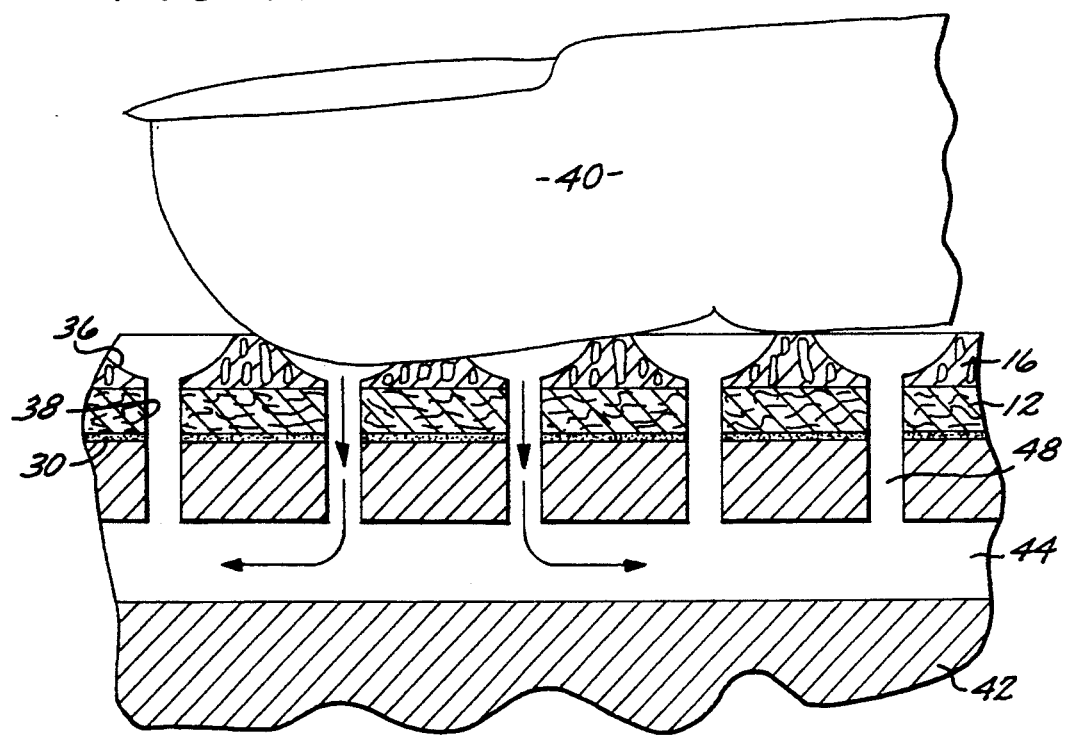
FIG. 10 is a broken sectional view in enlarged scale showing how the grip of FIGS. 1-9 deforms when grasped by a user to pump air through the racquet passages.
Figure 11:
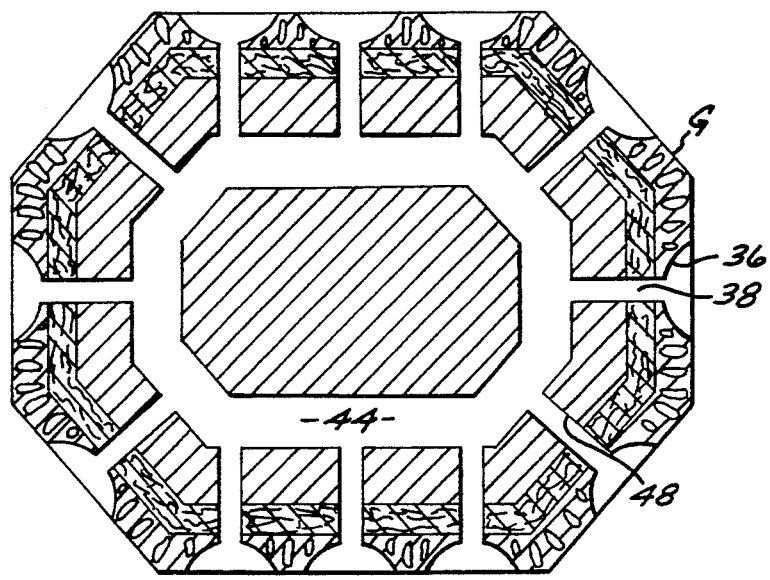
FIG. 11 is a horizontal sectional view in enlarged scale taken on line 11—11 of FIG. 9, with the upper portion of the racquet being deleted in the interest of clarity.

Grip G is mounted on tennis racquet R-1 in the same manner described herein with respect here in FIGS. 1–8. Specifically referring to FIG. 5, the grip G will be spirally wrapped around racquet handle 42 after a protective tape (not shown) has been stripped off the adhesive 30. Referring additionally to FIG. 9, it will be noted that the horizontally extending air passages 48 are arranged in a spiral pattern conforming to the spiral pattern utilized to apply the grip G to the racquet handle 42. In this manner the perforations and dimples of the grip will be properly spaced to be in alignment with the horizontal air passages 48.

Referring now to FIGS. 13 and 14, there is shown a sleeve type grip SG embodying the present invention. The materials and construction of the grip SG is similar to that of the grip G, in that grip SG is provided with a textile layer 12' similar to the felt layer 12 of grip G which has its upper surface bonded to the lower surface of a polyurethane layer 16'. The polyurethane layer 16' is formed with pores (not shown) which extend vertically, i.e., generally normal to the longitudinal access of the racquet handle 42 when the grip is affixed to such handle. The thickness ratio of the felt and polyurethane layers will be similar to the thickness ratios described herein with respect to grip G. When grip SG is slipped over the racquet handle 42 the dimples 36' and perforations 38' will be aligned with the horizontal air passages 48 of the racquet handle 42. Accordingly, the grip SG will cooperate with the vertical and horizontal air passages 44, 46 and 48 of the racquet handle 42 to provide a pumping action when the grip SG is grasped by the fingers of a user so at to provide the advantages of the grip G as described previously herein.

Various modifications and changes may be made with respect to the foregoing detailed description without departing from the spirit of the present invention.

What is claimed is:

1. The combination of a racquet and a grip for the handle of such racquet, wherein the grip comprises, an open-pored textile layer having an inner surface adhered to and abutting said handle, and a smooth closed pore polyurethane layer having its inner surface bonded to the outer surface of the textile layer remote from said handle, with the pores of such polyurethane layer extending generally normal to the longitudinal axis of said handle, said polyurethane layer being formed with a plurality of inwardly extending dimples, the lower end of each of which merge into a perforation that extends inwardly through said felt layer; and the racquet handle is formed with vertically extending air passages that are in communication with the atmosphere, said vertical passages intersecting horizontally extending air passages formed in the handle, the grip perforations being in alignment with the horizontal air passages whereby air is forced through said dimples, perforations, and racquet passages when the grip is grasped by a user with his palm and fingers covering some of the dimples.

2. The combination as set forth in claim 1 wherein the diameter of each dimple at its intersection with the outer surface is about $\frac{1}{8}$", and the diameter of each perforation is about 1/32".

3. The combination of claim 2 wherein the thickness ratio of the polyurethane layer is about equal to or thicker than the thickness of the textile layer.

4. The combination of claim 3 wherein the grip is in the form of a strip which is spirally wrapped about the handle.

5. The combination of claim 2 wherein the grip is in the form of a sleeve which encompasses the handle and the thickness ratio of the polyurethane layer is about equal to or thicker than the thickness of the textile layer.

6. The combination as set forth in claim 1 wherein the thickness ratio of the polyurethane layer is about equal to or thicker than the thickness of the textile layer.

7. The combination as set forth in claim 1 wherein the grip is in the form of a strip which is spirally wrapped about the handle.

8. The combination as set forth in claim 1 wherein the grip is in the form of a sleeve which encompasses the handle.

* * * * *